United States Patent [19]

Krantz

[11] Patent Number: 4,610,702

[45] Date of Patent: Sep. 9, 1986

[54] FILTER APPARATUS FOR AIR OR GAS PURIFICATION

[75] Inventor: Anders Krantz, Söderala, Sweden

[73] Assignee: Industriell Arbetshygien i Soderhamn AB, Sweden

[21] Appl. No.: 694,453

[22] PCT Filed: May 7, 1984

[86] PCT No.: PCT/SE84/00172

§ 371 Date: Jan. 3, 1985

§ 102(e) Date: Jan. 3, 1985

[87] PCT Pub. No.: WO84/04467

PCT Pub. Date: Nov. 22, 1984

[30] Foreign Application Priority Data

May 10, 1983 [SE] Sweden ............................ 8302657
Jul. 13, 1983 [SE] Sweden ............................ 8303959

[51] Int. Cl.$^4$ ............................................ B01D 27/06
[52] U.S. Cl. .......................................... 55/155; 55/316; 55/487; 55/498; 55/521; 55/300
[58] Field of Search ................... 55/96, 97, 103, 131, 55/155, 316, 387, 477, 482, 486–488, 498, 521, 300; 210/353

[56] References Cited

U.S. PATENT DOCUMENTS 2,911,064  11/1959  Evans et al. ...................... 55/300
2,973,830  3/1961   Gruner ............................. 55/103
4,115,082  9/1978   Newell ............................. 55/103
4,332,230  3/1982   Schoen et al. .................... 55/387
4,336,043  6/1982   Aonoma et al. ................... 55/487

FOREIGN PATENT DOCUMENTS 0081297   6/1983   European Pat. Off. .
2627915   1/1978   Fed. Rep. of Germany .
8207099   7/1984   Sweden .
900450    7/1962   United Kingdom ............. 55/486
1397151   6/1975   United Kingdom ............. 55/477
2017530   10/1979  United Kingdom .

Primary Examiner—Bernard Nozick
Attorney, Agent, or Firm—Larson & Taylor

[57] ABSTRACT

A filter device for purifying air or gas comprises at least one filter layer (2) which is hit and permeated by a gas flow passing through the filter device, so as to separate contaminated constituents from said gas flow. In the immediate vicinity of the front surface of the filter layer (2) that is initially hit by the advancing gas, there are mounted a plurality of flexible strips (8) of a fibrous or non-woven material which are movable with respect to said surface and adapted automatically to be set in motion by the advancing gas in order to whip or otherwise mechanically work said filter layer (2) to counteract premature clogging thereof, and adapted themselves to intercept and separate contaminated constituents from the gas flow so as to prefilter the gas flow before it reaches the filter layer (2).

7 Claims, 6 Drawing Figures

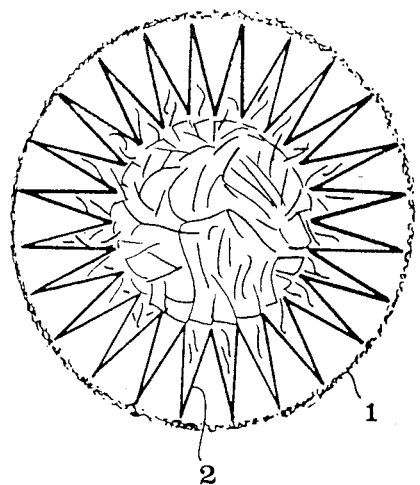
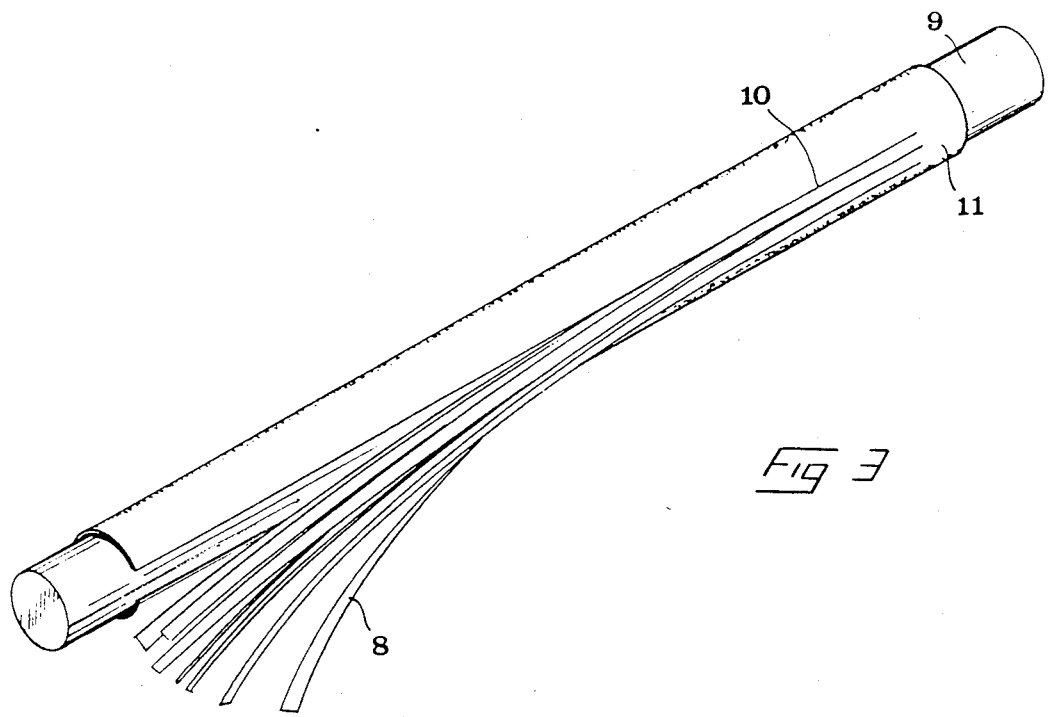

FILTER APPARATUS FOR AIR OR GAS PURIFICATION

TECHNICAL FIELD OF THE INVENTION

The present invention relates to a filter apparatus or device for air or gas purifying purposes of the type comprising at least one filter layer which is hit and permeated by a gas flow passing through the filter device, so as to separate contaminated constituents from the gas flow.

BACKGROUND OF THE INVENTION

Swedish patent application 8207099-6 discloses a filter device in the form of an integrated bag unit consisting of a coarse filter bag and a fine or microfilter bag enclosing the coarse filter bag. An essential advantage of this filter device is that the coarse filter and the fine filter can be dismounted and disposed of as a single unit. It has however proved difficult to give the coarse filter bag or layer such a fibre structure that it will intercept and separate only the relatively coarse constituents of the air stream while letting through the finer constituents to the fine filter layer. Thus, both the coarse and the fine constituents jointly tend to be agglomerated in and on the coarse filter layer so as to cause premature clogging thereof. As a result, the whole filter device will have a short service life.

BRIEF DESCRIPTION OF THE INVENTIVE CONCEPT

The present invention aims at solving the above-mentioned problem and providing a filter device having a long life. According to the invention, this is achieved in that at least in the immediate vicinity of the front surface of the filter layer that is initially hit by the advancing gas, there are mounted a plurality of flexible strips of a fibrous or non-woven material which are movable relative to said surface and adapted to be automatically set in motion by the advancing gas flow in order to whip or otherwise mechanically work said filter layer to counteract premature clogging thereof, and adapted themselves to intercept and separate contaminated constituents from the gas flow so as to prefilter the gas flow before it reaches the filter layer.

BRIEF DESCRIPTION OF THE ACCOMPANYING DRAWINGS

In the drawings,

FIG. 1 is a longitudinal section of a filter apparatus or device according to the invention, FIG. 2 is a cross-section taken along the line II—II in FIG. 1, FIG. 2A is a cross-sectional view similar to FIG. 2, but showing a modification of the invention, FIG. 3 is a perspective view illustrating a method for making the strips used in the filter device, FIG. 4 is a longitudinal section of an alternative embodiment of the filter device according to the invention, and FIG. 5 is a cross-section taken along the line V—V in FIG. 4.

DETAILED DESCRIPTION OF PREFERRED EMBODIMENTS OF THE INVENTION

Figure 1:
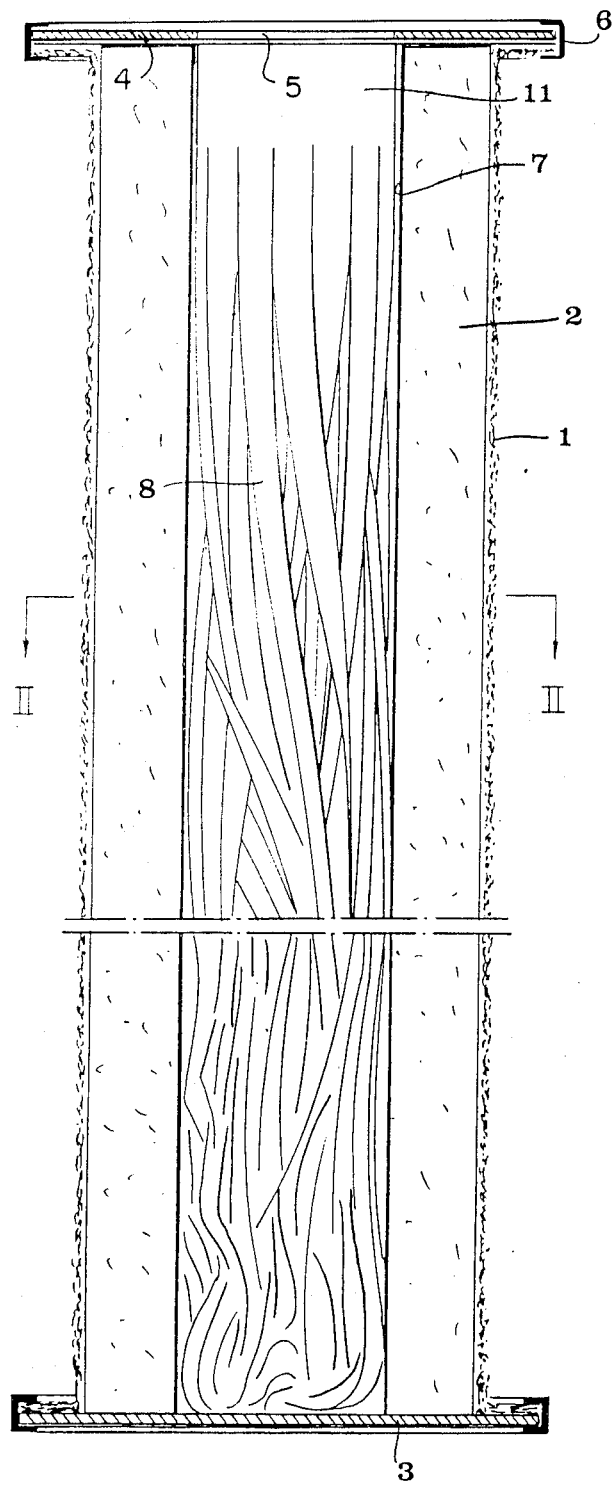

The filter apparatus or device shown in FIGS. 1 and 2 generally is in the form of a cylindrical tube or tubular assembly consisting of an outer tubular fine filter layer 1 and a coarse filter layer 2, being also substantially tubular, which is located within the fine filter layer 1 and which, in the shown embodiment, has been folded in order to increase the surface of the layer exposed to filtering. At one end, the thus formed tubular assembly is closed by means of a flat, suitably circular plate 3 consisting of a rigid and suitably inexpensive material, such as board or corrugated board. At the opposite end, the tubular assembly is provided with a flat annular plate 4 having a central opening 5 which forms the inlet of the filter device. In actual practice, the plate 4 may advantageously consist of the same material as the plate 3. The plates 3, 4 are connected to the layers 1 and 2 in any suitable manner, although the layers are preferably secured to the plates by gluing, optionally supplemented with edge rings 6 which embrace and hold together the edges of the plates and outwardly folded edge portions of the outer layer 1.

As appears from the drawings, a cavity 7 is defined by the coarse filter layer 2 and the bottom plate 3. According to the inventive concept, this cavity accommodates a plurality of elongate flexible strips 8 which are adapted automatically to be set in motion by the air which enters the cavity and leaves through the two layers 2, 1. These strips are suitably made from a fibrous or non-woven material, for instance cellulose fibres. In actual practice, it is preferred to use thin strips, for instance within the range of 0.05–0.25 mm, which have a relatively wide-meshed fibre network structure but nevertheless exhibit high tearing resistance and substantial breaking length. The fibre material used may therefore, in addition to fibres from chemical pulps of pine or spruce, also consist of fibres derived from flax, jute, hemp, cotton or linters. According to a special feature, the strip material may also contain a suitable amount of artificial fibres of different kinds, e.g. polyester fibres which impart electrostatic properties to the strip material, with a view to increasing the dust collecting properties of the strips as at the same time they will tend to repel each other to an increasing extent.

As seen in FIG. 1, the number of strips is so large that the cavity 7 in the tubular assembly is substantially completely filled with strips which are in contact with each other although partially separated by small irregular voids, so as to form a bundle of randomly oriented strips in the cavity. It should be noted in particular that the strips are so thin or fine that they will also, at least partially, fill the spaces between the folds of the coarse filter layer 2.

Reference is now had to FIG. 3 which illustrates a preferred method for making the strips described above. In accordance with this method, a web of material of any suitable kind is wound several turns about a suitably cylindrical core 9, whereupon a number of substantially parallel cuts 10 are made in the superposed layers of the web. The cuts are given a length which is slightly shorter than the extent of the web of material in the longitudinal direction of the core, thus leaving between one edge of the web of material and each cut an uncut portion 11 which holds together the different strips as an integral unit. This unit can thereafter be placed in the cavity 7 of the filter device, and part of the uncut portion 11 is folded over the upper edge of the coarse filter layer 2 and is glued between this layer and the annular plate 4. This means that each strip is fixed only at one end in the area of the inlet opening 5 of the filter device whereas the remaining part of the strip which is hanging down in the cavity 7 is freely movable. The material of the strips may advantageously have or be given a tendency to curl or crease so that the strip portions hanging down in the cavity will form a deliberately disordered configuration which does not follow a predetermined pattern.

In the special embodiment illustrated in FIGS. 1 and 2, the coarse filter layer 2 is assumed to consist of a material having at least a certain inherent stiffness enabling the folded coarse filter layer alone to form a supporting or rigid body. In actual practice, this coarse filter layer may be made of a paper having a thickness of 0.5–2.0 mm. In addition to conventional cellulose fibres, this paper may contain one or more types of artificial fibres, for instance such artificial fibres as impart electrostatic properties to the layer. The fine filter layer 1 may also have a certain inherent stiffness, although not necessarily as pronounced as that of the body 2. However, it is essential that the layer 1 has a relatively close fibre structure to act as a micro- or fine filter capable of intercepting and retaining constituents which are considerably finer than the coarse constituents intercepted by the layer 2.

MODE OF OPERATION OF THE INVENTION

As the current of air which enters through the inlet opening 5 and is sucked or pressed out through the layers 2, 1, is passing through the cavity 7, the strips 8 are set in motion. More precisely, this motion means that each strip will be caused to flap gently under the mechanical action of adjacent strips, and the strips in the bundle which are in the immediate vicinity of the front surface of the filter layer 2 facing the current of air will beat or scrape against said surface. This, in turn, results in that the fine and coarse constituents or pollutants present in the current of air will not jointly deposit on the surface of the layer but will be maintained in motion in such a manner that the coarse constituents only are caught by the filter layer 2 whereas the finer constituents can pass on to the fine filter layer 1. This effect has been observed in practical experiments in which the filter device now described has been compared with a corresponding filter device without strips and in which it has been established that the strip-equipped filter device has a life more than ten times longer than that of the filter device without such strips. Another reason for this increase in service life is that the bundle of strips in its entirety has a distributing and velocity reducing effect, in addition to the above-mentioned self-cleaning effect. Thus, the strips will decelerate the air flow entering through the inlet opening 5 and divide it into a number of small partial currents which gently proceed through the meanders and small voids defined by the strips, while distributing these partial currents substantially evenly throughout the length of the entire filter device or the entire surface of the coarse filter layer 2 exposed to the current of air. This distribution of the air flow into a plurality of partial currents also has a protective effect in that extremely coarse or hard constituents which may be entrained by the main current of air will never be able to directly contact the coarse filter layer 2. Consequently, such constituents are intercepted by the strips which may thus be considered to serve as a prefilter for the coarse filter layer. Further, it should be noted that the strips 8 are themselves capable of intercepting a relatively large proportion of the solid constituents entrained by the air flow. An additional advantage inherent in the use of strips according to the invention and being very valuable in actual practice is that the constituents separated within the cavity 7 will be essentially completely retained in the cavity since the strips form a fyke-net-like arrangement which, while admitting solid constituents into the cavity, prevents them from escaping therefrom. In practical trials, it has thus been found that no appreciable amounts of dust will escape from the cavity even if the filter device is turned upside down with the opening 5 facing downwards. This dustretaining effect will be particularly pronounced in those cases where the strips 8 are made of a material having electrostatic properties, since the rubbing or friction occurring between the strips will make them highly electrostatic so that the dust particles will be attracted by the strip surfaces and adhere thereto.

Figure 4:
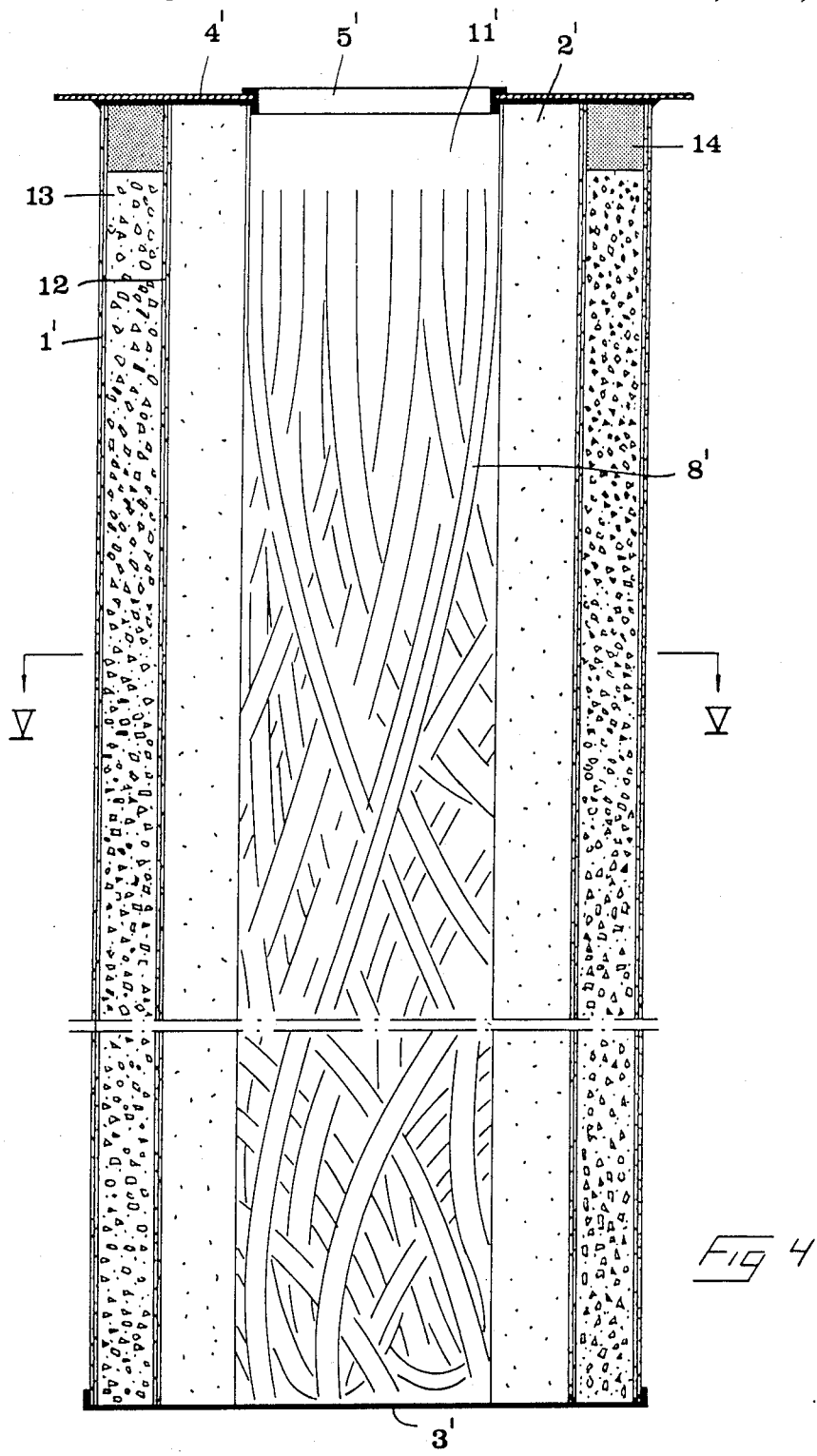
Figure 5:
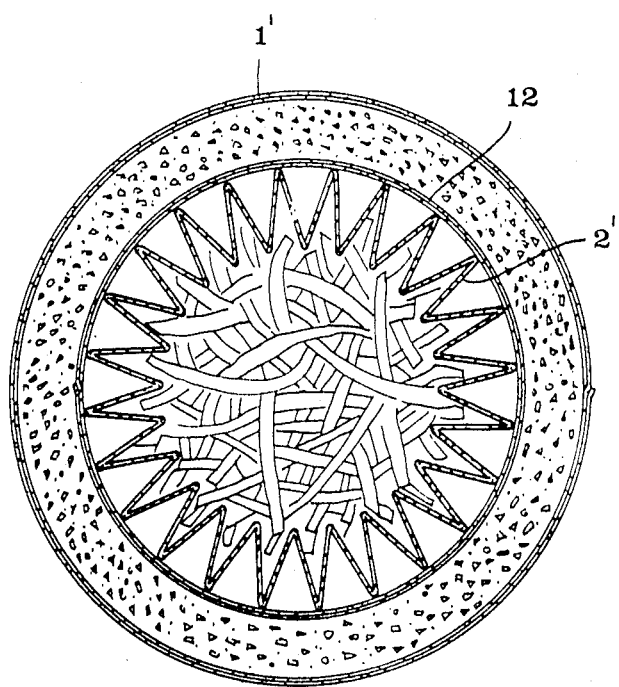

In FIGS. 4 and 5, there is shown a further developed embodiment in which the filter device, in addition to a coarse filter layer 2' and a fine filter layer 1' (in the form of tubes), comprises a further filter layer, namely a tube 12 disposed in direct conjunction with the coarse filter tube 2'. Between the filter tube 1' and the filter tubes 2', 12 there is thus formed an annular gap 13 having a width which in actual practice may amount to 5–25%, suitably about 10%, of the overall diameter of the filter device. This gap accommodates an adsorbent which substantially fills the gap. In actual practice, this adsorbent may be a granular and/or particulate material, such as activated carbon or a material commercially available under the tradename PURAFIL ®.

Although the adsorbent in the gap 13 is caused to completely fill the annular space in connection with the manufacture of the filter device, the adsorbent always tends to be compacted as a result of shocks and vibrations, for instance in connection with transportation from the factory to the place of use. In order to avoid that such a compaction of the adsorbent should result in the formation of unfilled spaces, there is provided in the gap 13 at least one ring 14 of an elastic expandable material, such as foam rubber or the like. This ring is compressed in connection with the manufacture of the filter device and according as the volume of the adsorbent decreases as a result of vibrations, the ring will expand correspondingly and fill the space which is not filled by the adsorbent such that the air or gas will always have to pass through the adsorbent.

It is conceivable to dispense with the third filter tube 12 and have the adsorbent also fill the spaces between the folds in the filter tube 2'. Also, it is conceivable to design the filter device with only two entirely cylindrical, i.e. unfolded filter tubes. By the presence of the adsorbent, the permeating gas will also be freed from volatile or gaseous, noxious constituents.

The filter device now described is particularly well suited for dust separators which are used for treating fumes from welding.

POSSIBLE MODIFICATIONS OF THE INVENTION

Figure 2A:
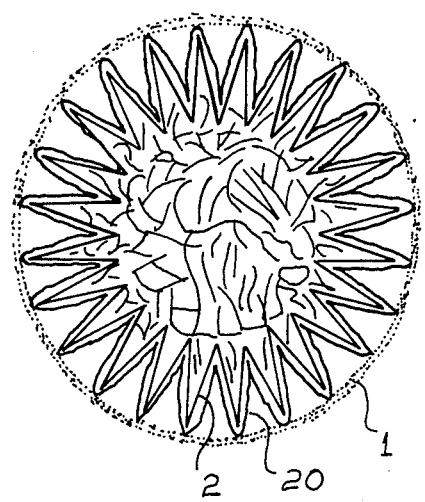

It will be apparent that the invention is not restricted only to the embodiments described above and illustrated in the drawings. Thus, in addition to the two filter layers, use may be made of further filter layers of which the innermost layer or the one first hit by the air flow cooperates with a bundle of strips as described above. Thus, for example, it is possible to dispose inwardly of the suitably, although not necessarily folded coarse filter layer an extremely thin filter layer which has a fibre structure of a wider mesh. Similarly, as shown in FIG. 2A, there may be provided between the layers 20 1 and 2 one or more additional fibrous layers whose fibre network structure has a mesh closer than that of the layer 2 but wider than that of the layer 1. In the space between the layers 1 and 2, there may also be provided a fibrous mass serving to intercept finer constituents from the current of air after it has passed through the coarse filter layer 2 and before it reaches the fine filter layer 1. This mass may for instance be cotton wool or the like.

Further, it will also apparent that the inventive concept is not restricted to the purification of air only but the filter device described may of course also be used for purifying any other gases.

If desired, a special supporting body or frame may be integrated in the filter device, for instance a lattice of metal, plastic or board which extends between the two plates 3 and 4, thus dispensing with the need to make either of the layers 1 and 2 rigid. Also, it should be pointed out that the inventive concept is not restricted precisely to the geometrical configuration shown in the drawings. Thus, the two filter layers, i.e. the coarse filter layer and the fine filter layer, need not be cylindrical but may have any other suitable shape. For example, the two layers may consist of two consecutive planar walls arranged transversely in an air conduit of any suitable type. It is then also possible to arrange two or more consecutive pairs of coarse and fine filter layers. Further, the strips described above may be replaced by other types of movable elements, such as threads of a fibrous nature. Also, it should be pointed out that these strip or thread elements may be treated in different ways, for instance be surfacetreated with a view to making the elements flameproof to eliminate the risk of fire, for example caused by sparks, e.g. from welding, which are entrained by the air flow. It is also conceivable to use strips or striplike elements of the aforementioned type in connection with simple tubes or bags which themselves form a coarse filter or a fine filter.

I claim:

1. A filfer apparatus for purifying air or gas, comprising a tubular assembly having at least one fine filter tubular layer and at least one coarse filter tubular layer disposed within said fine filter tubular layer and defining a central cavity, a plurality of flexible strips of a fiberous material mounted in the cavity so as to be movable relative to the inner surface of said coarse filter tubular layer and so as to be set in motion by air passing through the filter apparatus such that the strips mechanically work said inner surface of said coarse filter tubular layer to counteract premature clogging thereof, said strips also comprising means for intercepting and separating contaminated constituents from the air flow so as to prefilter the air flow before it reaches the coarse filter tubular layer, the number of strips being such that the cavity confined by said coarse filter tubular layer is substantially completely filled with strips contacting each other but partially separated from each other by small irregular voids so as to form a bundle of randomly oriented strips in said cavity.

2. A filter apparatus according to claim 1, wherein the strips contain fibers which impart electrostatic properties to the strips.

3. An apparatus according to claim 1, wherein one end of the tubular assembly is closed while the opposite end thereof is open and constitutes an inlet opening for air which flows into said cavity and leaves through the coarse filter tubular layer and thereafter through the fine filter tubular layer, and wherein each strip is fixed only at one end, that one end being in the area of the inlet opening of the tubular assembly, such that each strip is freely movable throughout its whole length with the exception of said fixed end.

4. A filter apparatus according to claim 1, wherein the strips are cut out from a web of material by means of a number of approximately parallel cuts, the length of which cuts are shorter then the extent of the web in the direction of the cuts, thus leaving an undercut portion of the web which holds the strips together as a coherent unit.

5. A filter apparatus according to claim 1, wherein the space between the coarse filter tubular layer and the fine filter tubular layer includes a fiberous mass serving to intercept fine constituents from the gas flow after it has passed through the coarse filter tubular layer and before it reaches the fine filter tubular layer.

6. A filter apparatus according to claim 1, wherein the space between the coarse filter tubular layer and the fine filter tubular layer contains an adsorbent.

7. A filter apparatus according to claim 6, wherein said space also includes at least one ring of elastic expandable material such as foam rubber to fill any voids in said space that are not filled by said adsorbent.

* * * * *